(12) United States Patent
Seok et al.

(10) Patent No.: US 7,611,688 B2
(45) Date of Patent: Nov. 3, 2009

(54) RUTILE TITANIA NANO SOLS AND PROCESS FOR MANUFACTURING THE SAME

(75) Inventors: Sang-Il Seok, Daejon (KR); Bok-Yeop Ahn, Daejeon (KR); Hoon Kim, Gwangju (KR)

(73) Assignee: Korea Research Institute of Chemical Technology (KR)

( * ) Notice: Subject to any disclaimer, the term of this patent is extended or adjusted under 35 U.S.C. 154(b) by 331 days.

(21) Appl. No.: 11/209,412

(22) Filed: Aug. 23, 2005

(65) Prior Publication Data

US 2006/0110319 A1    May 25, 2006

(30) Foreign Application Priority Data

Nov. 19, 2004   (KR) ............... 10-2004-0095394

(51) Int. Cl.
- C01G 23/047 (2006.01)
- C01G 25/02 (2006.01)
- C01G 27/02 (2006.01)
- C01B 13/14 (2006.01)

(52) U.S. Cl. ............ 423/610; 423/608; 423/579; 423/592.1

(58) Field of Classification Search ............ 423/610, 423/402, 403, 608
See application file for complete search history.

(56) References Cited

U.S. PATENT DOCUMENTS

| | | | |
|---|---|---|---|
| 5,051,183 A | 9/1991 | Takita et al. | 210/500.36 |
| 6,440,383 B1 | 8/2002 | Duyvesteyn et al. | 423/611 |
| 7,304,106 B2 * | 12/2007 | Brady et al. | 524/410 |
| 2006/0110319 A1 * | 5/2006 | Seok et al. | 423/610 |

FOREIGN PATENT DOCUMENTS

| | | |
|---|---|---|
| JP | 62-283817 | 12/1987 |
| JP | 10212121 | 8/1998 |
| JP | 200158825 | 3/2001 |
| JP | 2001-172019 | 6/2001 |
| KR | 2000-0066290 A | 11/2000 |
| KR | 1020040007586 | 1/2004 |

OTHER PUBLICATIONS

Uekawa et al. "Synthesis of rutile and anatase TiO2 nanoparticles with Ti-peroxy compound aqueous solution with polyols". J. Mater. Res., vol. 18, No. 4, Apr. 2003.*

"Rutile Formation in Hydrothermally Crystallized Nanosized Titania"; Authors: Revathi R. Bacsa and Michael Gratzel; J. Am. Ceram. Soc., 79 (8), 2185-88 (1996).

(Continued)

*Primary Examiner*—Jerry Lorengo
*Assistant Examiner*—Jennifer A Smith
(74) *Attorney, Agent, or Firm*—Cantor Colburn LLP

(57) ABSTRACT

The present invention is related to a process of manufacturing rutile high-purity titania nano sols in a pure aqueous medium having no ionic impurities. In more detail, the present invention is related to a process for manufacturing titania nano sols, in which high-purity rutile titania nano particles are dispersed stably, through the hydrolysis of titanium tetraisopropoxide in an aqueous solution containing hydrogen peroxide ($H_2O_2$), and simultaneously with the hydrolysis, formation of peroxotitanate precursors, and hydrothermal treatment of them at 50-120° C.

2 Claims, 3 Drawing Sheets

OTHER PUBLICATIONS

Sol-Gel Synthesis and Hydrothermal Processisng of Anatase and Rutile Titania Nanocrystals; Authors: Chen-Chi Wang and Jackie Y. Ying; Che, Mater., 11,3113-3120 (1999).

"Nanosize Rutile Titania Particle Synthesis Via a Hydrothermal Method Without Mineralizers"; Authors: S. T. Aruna, S. Tirosh and A. Zaban; J. Mater. Chem., 10-2388-2391 (2000).

"A Novel Method for Preparation of Nanocrystallilne Rutile $TiO_2$ Powders by Liquid Hydrolysis of $TiCl4$"; Authors: Yuanzhi Li, Yining Fan and Yi Chen; J. Mater. Chem., 12, 1387-1390 (2002).

"Homogeneous Precipitaiton of $TiO_2$ Ultrafine Powders Form Aqueous $TiOCl2$ Solution"; Authors: Sun-Jae Kim, Soon-Dong Park, and Yong Hwan Jeong; J. Am. Ceram. Soc., 82, 927 (1999).

Synthesis of Rutile (a-$TiO_2$) Nanocrystals With Controlled Size and Shape by Low-Temperature Hydrolysis: Effects of Solvent Composition; Authors: Wei Wang, Baohua Gu, Liyuan Liang, William A. Hamilton, and David J. Wesolowski; J. Phys. Chem. B. 108, 14789 (2004).

"Properties of Anatase Films for Photocatalyst From Peroxotitanic Acid Solution and Peroxo-Modified Anatase Sol"; Hiromichi Ichinoise, Akihiko Kawahara and Hiroaki Katsuki; J. Ceram. Soc. Jpn., 104, 715 (1996).

Fedii, A. A.; Lukshina, S. N.; Sadykov, R. M.; Sablina, E. V. Effect of antimony oxide additives on the properties of titanium dioxide containing iron and chromium oxides as impurities. Lakokrasochnye Materialy i Ikh Primenenie (1989), (1), 10-12. CODEN: LAMAAD ISSN:0023-737X. CAN 111:99007 AN 1989:499007 CAPLUS.

Berry, Frank J.; Gogarty, Patricia M. An investigation of phases in the titanium—antimony -oxygen system. Inorganica Chimica Acta (1988), 141(1), 53-6. CODEN: ICHAA3 ISSN:0020-1693. CAN 108:123195 AN 1988:123195 CAPLUS.

Eppler, Richard A. Effect of antimony oxide on the anatase—rutile transformation in titanium dioxide. Journal of the American Ceramic Society (1987), 70(4), C/64-C/66. CODEN: JACTAW ISSN:0002-7820. CAN 106:181304 AN 1987:181304 CAPLUS.

Sheinkman, A. I.; Gol'dshtein, L. M.; Turlakov, V. N.; Kleshchev, G. V. Phase formations during the interaction of antimony oxides with hydrated titanium dioxide. Zhurnal Prikladnoi Khimii (Sankt-Peterburg, Russian Federation) (1972), 45(5), 940-4. CODEN: ZPKHAB ISSN:0044-4618. CAN 77:67154 AN 1972:467154 CAPLUS.

\* cited by examiner

RUTILE TITANIA NANO SOLS AND PROCESS FOR MANUFACTURING THE SAME

TECHNICAL FIELD

The present invention is related to a process for manufacturing high-purity rutile titania nano sols in a pure aqueous medium having no ionic impurities. In more detail, the present invention is related to a process for manufacturing titania nano sols, in which titania nano particles are dispersed stably, through the hydrolysis of titanium tetraisopropoxide (hereinafter referred to as TTIP) in an aqueous solution containing hydrogen peroxide ($H_2O_2$), and simultaneously with the hydrolysis, formation of peroxotitanate precursors, and hydrothermal treatment of them at 50-120° C. Compared to rutile nano particles manufactured in the conventional methods, the titania sols manufactured according to the present invention may be used for optical materials having a high refractive index, electronic materials having a high dielectric constant, etc. as it has an excellent dispersibility in solvents without any ionic impurities such as $Cl^-$, $NO_3^-$, $SO_4^{2-}$, or the like.

BACKGROUND ART

Titania ($TiO_2$) is stable physically and chemically and has a refractive index of greater than 2.5, which is greater than that of diamond having the greatest refractive among natural materials. If a refractive index is large in an optical material, the amount of light coming out of a medium having a low refractive index becomes large, and it is possible to reduce the size of the core in an optical waveguide and the thickness of an optical lens. Also, if highly refractive particles are dispersed in a polymer, the degree of whiteness will be increased by enhanced scattering of light. Titania is one of important industrial materials that have been used for white pigments for a long time owing to its high refraction characteristic. Further, it is one of the main components of piezoelectric materials, dielectrics, and semi-conductors according to the development of electronic industry since it is characterized by a high dielectric constant. Still further, it has been the trend recently that its application to cosmetics, photocatalytic thin layers, fillers, paints, lubricants, precision ceramics, etc. using UV shielding and absorbance properties as well as a catalyst for removing organic contaminants according to the chemical corrosion resistance and photocatalytic effect has been extended rapidly.

Titania ($TiO_2$) exists in three main crystalline forms; anatase, rutile and brookite. It was well known that each phase has different physical properties such as refractive index, dielectric constant, and photochemical activity, etc. Among these three, brookite is neither a crystal type existing under general conditions nor important industrially. With respect to each use, the crystal structures of rutile and anatase, that are useful industrially, are reviewed below: Both of anatase and rutile are based on an octahedra ($TiO_6^{2-}$) unit and have a tetragonal structure by occupying edges and corners in different ways, and are $TiO_2$ stoichiometrically. However, in the rutile type, two encountering edges of each octahedra occupy each other and form linear chains in the (001) direction, where each chain is connected to each other by occupying oxygen atoms in corners. On the other hand, anatase has four occupied edges of each octahedra although it does not occupy corners. The anatase structure is shown to be zigzagged chains of octahedra and is connected to each other through the occupied edges thus occupying more edges than rutile does, but its interstitial space between octahedras is greater. Due to such structural difference, although rutile and anatase have the same chemical formula, the refractive index is about 2.7 for rutile while that of anatase is 2.5, and the dielectric constant of rutile is 114 and that of anatase is 31, meaning that of rutile is almost 4 times greater than that of anatase. Accordingly, for the uses related to optical or electronic materials, rutile is used more importantly for industry than anatase titania is.

Titania can be synthesized by several methods such as inert gas condensation, oxidation-hydrothermal synthesis of metallic Ti, frame hydrolysis of $TiCl_4$, and sol-gel: There are many reports on the preparation of anatase particles with sizes raging from several nm to several microns and a variety of shapes. With regard to rutile titania powders, unlike anatase, it was known that the preparation of rutile particles, particularly nanosizses, is much more difficult. Thermodynamically stable rutile can be obtained by high temperature calcinations of the kinetically stable anatase phase. However, calcinations at a high temperature unavoidably led to the formation of large particle size and coagulation of nano particles making its use limited. In order to resolve such problems, many researchers have put their efforts into the manufacture of rutile titania nano particles at a low temperature. Reported in Korean Patent No. 2000-0066290; U.S. Pat. No. 6,440,383; R. R. Bacsa et al. *J. Am. Ceram. Soc.*, 79, 2185 (1996); C-C Wang et al. *Chem, Mater.*, 11, 3113 (1999); S. T. Aruna et al. *J. Mater. Chem.*, 10, 2388 (2000); Y. Li et al. *J. Mater. Chem.*, 12, 1387 (2002); S. J. Kim et al. *J. Am. Ceram. Soc.*, 82, 927 (1999); and W. Wang et al. *J. Phys. Chem. B.* 108, 14789 (2004) are the methods of manufacture of rutile nano particles in an aqueous solution. However, in all these methods, rutile-phase titania nano particles are manufactured by hydrolysis methods at a room temperature by using $TiCl_4$ and $TiOCl_2$ as starting materials, or in the hydrothermal treatment method at 100-250° C. in an autoclave after re-dissolving titanium hydroxide or amorphous $TiO_2$ obtained from TTIP, etc. by adding highly concentrated nitric acid or hydrochloric acid with citric acid. Undesirably, the rutile nano particles manufactured accordingly suffers from the presence of contaminant salts and, hence, the particles should be repeatedly washed to eliminate the salts. Such property makes rutile titania nano particles very limited in being used for electronic or optical materials.

Also, reported in JP-A 1987-283817 and Ichinose et al. *J. Ceram. Soc. Jpn.*, 104, 715 (1996) are the methods of manufacture of titania nano sols from peroxotitanate solution, prepared by dissolving again titanium hydroxide with hydrogen peroxide. However, nano sol particles manufactured according to the above methods all have anatase crystals.

As described in the above, the conventionally manufactured rutile titania ($TiO_2$) nano sols or particles are contaminated with a large amount of ionic impurities. Even if special processes for removing impurities are added, it is very difficult to remove impure ions adsorbed to the surface of nano particles completely in view of the characteristics of nano particles having a high specific surface area.

As a result of putting efforts into the resolution of the above-described problems, the inventors of the present invention invented a process for manufacturing nano-sized rutile titania sols having no ionic impurities at all by using only both high-purity TTIP and hydrogen peroxide.

Since the crystal phase of the rutile sols manufactured according to the present invention have a rutile structure completely, which means that it has a high refractive index and dielectric constant, with a particle size of less than about 30 nm, a very excellent dispersibility in an aqueous medium, and no ionic impurities at all, it may be used for optical materials having a high refractive index and transparent insulator films having a high dielectric constant for organic thin film transistors (OTFTs).

SUMMARY OF THE INVENTION

The present invention involves the hydrolysis of TTIP and a simultaneous digestion of hydrolyzed precipitates, and hydrothermal treatment into crystalline phases. This method is related to a process for manufacturing rutile titania nano sols through the hydrolysis of TTIP comprised of the steps of hydrolysis of TTIP, and simultaneously with the hydrolysis, manufacture of a peroxotitanate solution by adding 0.005-0.05 mole ratio of TTIP to hydrogen peroxide in a mixed solvent having the aqueous solution to hydrogen peroxide mole ratio of 10-158:1; and manufacture of a crystalline rutile titania nano sol in the hydrothermal treatment method of the above peroxotitanate solution while refluxing it.

The present invention is illustrated in more detail below:

Firstly, a mixed solvent of deionized water and hydrogen peroxide is made.

Inasmuch as the step of hydrolysis of TTIP and manufacture of a peroxotitanate compound by reacting the hydrolyzed product with hydrogen peroxide is a very important step in the manufacture of rutile titania nano particles, a mixed solvent of deionized water and hydrogen peroxide at a weight ratio of 9-90 times, preferably, 10-158 mole ratio, is used. The mole ratio of the above mixed solvent is determined for the hydrolysis of TTIP and the production of a peroxotitanate compound at the same time. If the weight ratio is devious from the above range, it may be difficult to control the reaction as too vigorous reaction occurs and the solvent becomes a gel, or no solution-phase transparent peroxotitanate is manufactured, which is not desirable for a precursor for the growth of rutile crystals. After that, hydrolysis and a chemical reaction of peroxotitanate solution are made to occur simultaneously by slowly dropping down TTIP to the above mixed solvent at a weight ratio of 0.001-0.5 with respect to that of hydrogen peroxide, preferably, at a mole ratio of 0.005-0.05. If the mole ratio of TTIP is lower than the above range, the concentration of titania sol thus manufactured becomes too low; and if it is greater than the above range, it is not desirable in that gelation occurs and it is difficult for rutile crystalline nano particles to grow.

Next, a rutile titania sol is manufactured through hydrothermal treatment of the aqueous solution in which peroxotitanate manufactured in the above is dissolved. The temperature of hydrothermal treatment is adjusted to 50-120° C. and the times to 0.5-24 hours in order to control the size of titania particles and change them to crystals.

Generally, the temperature of hydrothermal treatment at which titania particles are shown to be crystalline in an amorphous hydroxide is in the range of 300-500° C., and it is necessary to perform hydrothermal treatment at a temperature higher than 800° C. in order to manufacture rutile titania. However, in the present invention, the same effects are obtained if hydrothermal treatment of a peroxotitanate compound in an aqueous solution is performed at 50-120° C., which is much lower than the above temperature, for 0.5-24 hours, preferably, for 3-12 hours. If the temperature and time of hydrothermal treatment are devious from the above ranges, it is not desirable in that no rutile crystals are shown and the particle size of the titania sol to be manufactured becomes too large making the titania sol unstable.

According to the above-described processes, it is possible to manufacture a nano-sized titania sol dispersed stably in an aqueous solution while having the rutile crystal structure. As a result of the measurement of the distribution of particle sizes of the titania sol of the present invention by using a dynamic light scatterer (DLS), the average particle size is shown to be less than 100 nm as shown in FIG. 2 attached. It is, again, observed that the particle sizes measured in the transmission electron microscope (TEM) are less than about 100 nm in rod-like shape.

Also, in order to measure the crystallinity of the titania sols manufactured in the present invention, sol particles are collected, dried at a room temperature for 12 hours, and their x-ray diffraction pattern is analyzed. The result of analysis is as shown in FIG. 1 attached. It is confirmed from the x-ray diffraction pattern in FIG. 1 that titania of the present invention has the rutile crystal structure.

In the meantime, the titania sols manufactured accordingly may be manufactured in the form of crystallized ultrafine rutile titania powder by removing the solvent in order to be applicable to many areas properly.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DESCRIPTION OF THE PREFERRED EMBODIMENTS

Figure 1:
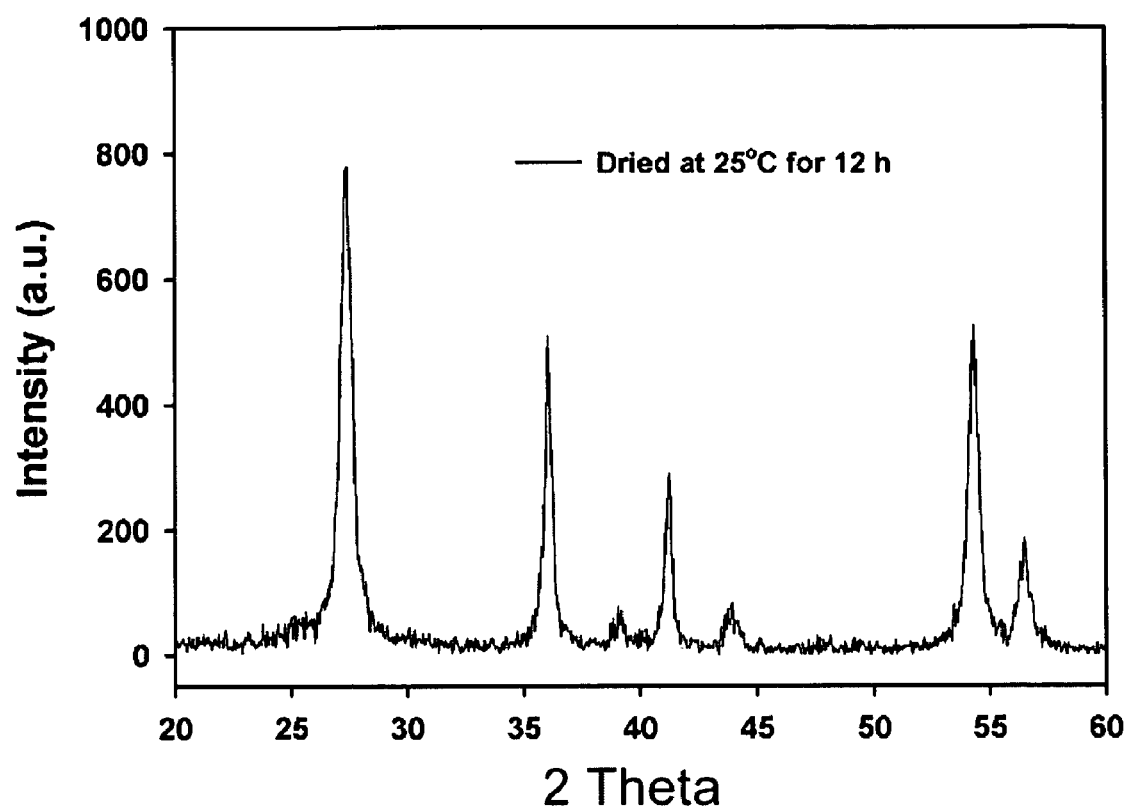
FIG. 1 shows an x-ray diffraction (XRD) pattern of the powder of a titania nano sol manufactured in the present invention.
Figure 2:
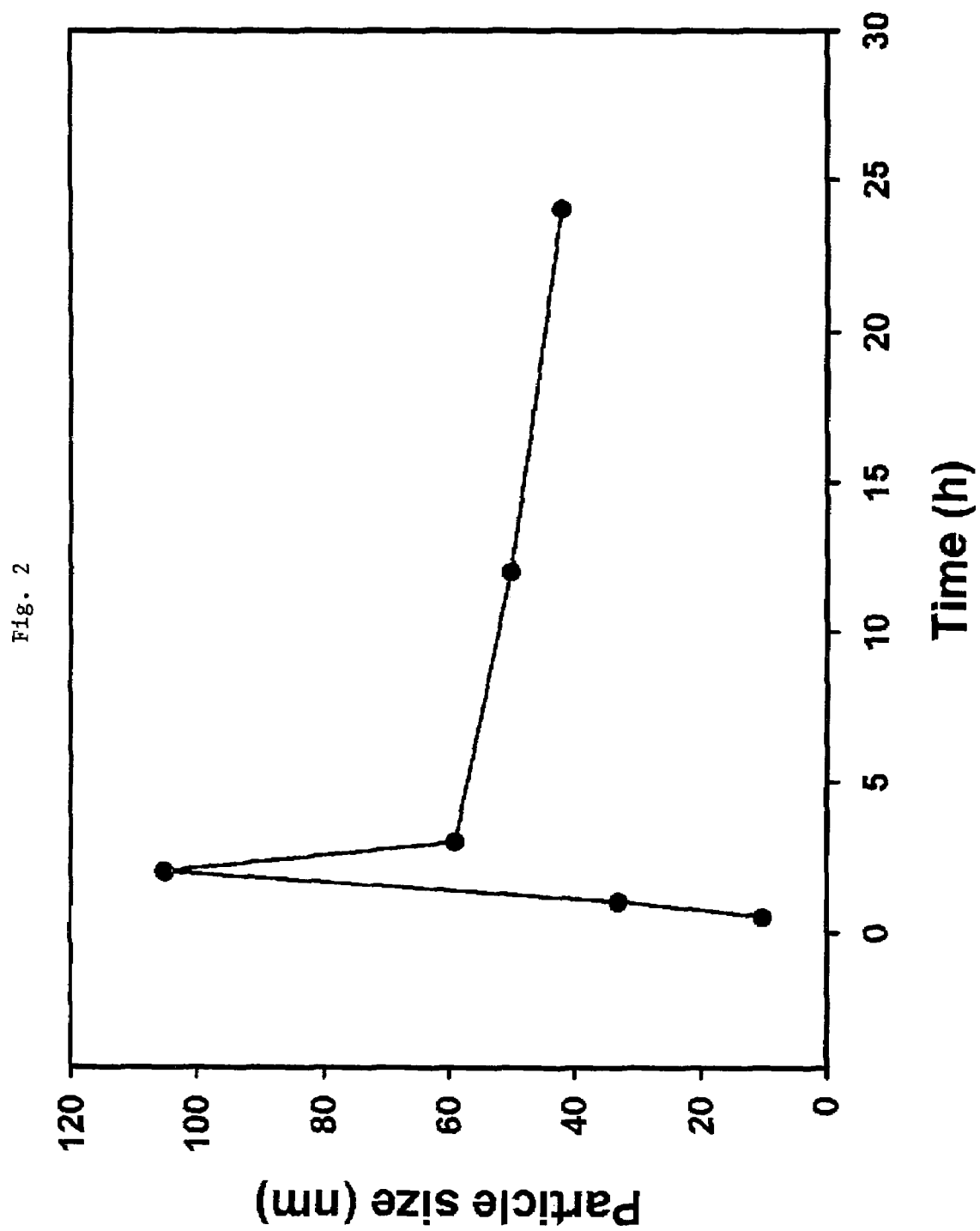
FIG. 2 shows the result of analysis of the distribution of particle sizes of a titania nano sol manufactured in the present invention with a dynamic light scatterer (DLS)
Figure 3:
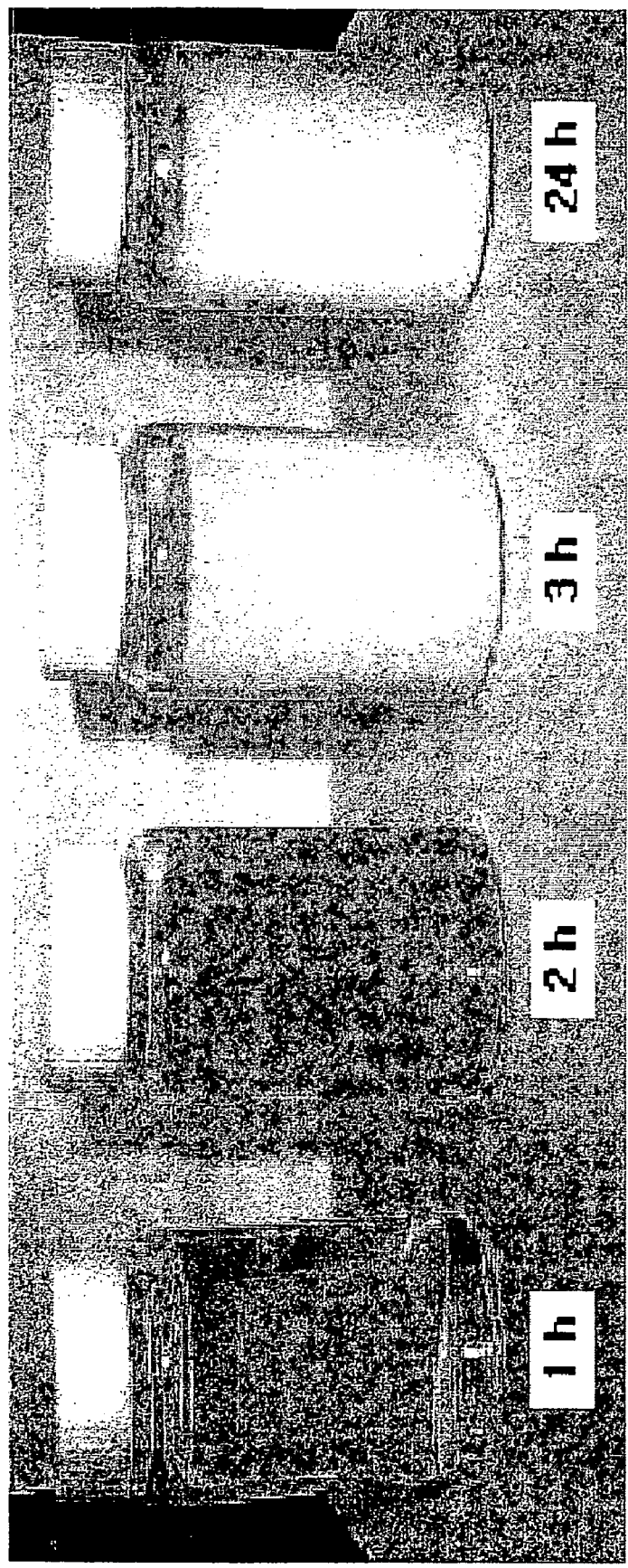
FIG. 3 is a photograph showing how a titania nano sol solution manufactured in the present invention is changed according to the time of hydrothermal treatment at 120° C.

The foregoing and other objects, aspects, and advantages will be better understood from the following detailed description of preferred embodiments of the invention:

Preferred Embodiment 1

A mixed solution of deionized water and hydrogen peroxide (35 wt. %) is made by mixing them at a mole ratio of 10:1 in a 250-ml Erlenmeyer flask. 0.01 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 120° C., and the solution is refluxed for 12 hours in order to manufacture a titania nano sol. The sol thus manufactured is vacuum-dried with a 0.02-µm membrane and dried at a room temperature for 12 hours to obtain its powder form. As a result of x-ray diffraction analysis of the powder, it is shown that the crystal size is about 12.07 nm, and that greater than 99% of the powder is in the form of rutile crystals.

Preferred Embodiment 2

A mixed solution of deionized water and hydrogen peroxide (35 wt. %) is made by mixing them at a mole ratio of 10:1 in a 250-ml Erlenmeyer flask. 0.03 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 120° C., and the solution is refluxed for 12 hours in order to manufacture a titania nano sol. The sol thus manufactured is vacuum-dried with a 0.02-μm membrane and dried at a room temperature for 12 hours to obtain its powder form. As a result of x-ray diffraction analysis of the powder, it is shown that the crystallite size is about 12.40 nm, and that greater than 99% of the powder is in the form of rutile crystals.

Preferred Embodiment 3

A mixed solution of deionized water and hydrogen peroxide (35 wt. %) is made by mixing them at a mole ratio of 10:1 in a 250-ml Erlenmeyer flask. 0.018 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 120° C., and the solution is refluxed for 12 hours in order to manufacture a titania nano sol. The sol thus manufactured is vacuum-dried with a 0.02-μm membrane and dried at a room temperature for 12 hours to obtain its powder form. As a result of x-ray diffraction analysis of the powder, it is shown that the crystallite size is about 11.69 nm, and that greater than 99% of the powder is in the form of rutile crystals.

Preferred Embodiment 4

A mixed solution of deionized water and hydrogen peroxide (35 wt. %) is made by mixing them at a mole ratio of 20:1 in a 250-ml Erlenmeyer flask. 0.03 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 120° C., and the solution is refluxed for 12 hours in order to manufacture a titania nano sol. The sol thus manufactured is vacuum-dried with a 0.02-μm membrane and dried at a room temperature for 12 hours to obtain its powder form. As a result of x-ray diffraction analysis of the powder, it is shown that the crystallite size is about 11.69 nm, and that greater than 99% of the powder is in the form of rutile crystals.

Preferred Embodiment 5

A mixed solution of deionized water and hydrogen peroxide (35 wt. %) is made by mixing them at a mole ratio of 20:1 in a 250-ml Erlenmeyer flask. 0.09 mole ratio of TTIP with respect to that of hydrogen peroxide is added to the mixed solution and stirred for 2 hours. An aqueous solution of red-orange transparent peroxotitanate is manufactured. The flask is placed on an oil bath of which temperature is adjusted in advance to 120° C., and the solution is refluxed for 12 hours in order to manufacture a titania nano sol. The sol thus manufactured is vacuum-dried with a 0.02-μm membrane and dried at a room temperature for 12 hours to obtain its powder form. As a result of x-ray diffraction analysis of the powder, it is shown that the crystallite size is about 8.80 nm, and that about 60% of the powder is rutile crystals and about 40% is anatase crystals.

Preferred Embodiment 6

A mixed solution of deionized water and hydrogen peroxide (35 wt. %) is made by mixing them at a mole ratio of 156:1 in a 250-ml Erlenmeyer flask. 0.185 mole ratio of TTIP with respect to that of hydrogen peroxide is added to the mixed solution and stirred for 4 hours. An aqueous solution of red-orange transparent peroxotitanate is manufactured. The flask is placed on an oil bath of which temperature is adjusted in advance to 120° C., and the solution is refluxed for 12 hours in order to manufacture a titania nano sol. The sol thus manufactured is vacuum-dried with a 0.02-μm membrane and dried at a room temperature for 12 hours to obtain its powder form. As a result of x-ray diffraction analysis of the powder, it is shown that the crystallite size is about 7.82 nm, and that about 40% of the powder is rutile crystals and about 60% is anatase crystals.

Preferred Embodiment 7

A mixed solution of deionized water and hydrogen peroxide (35 wt. %) is made by mixing them at a mole ratio of 10:1 in a 250-ml Erlenmeyer flask. 0.018 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 90° C., and the solution is refluxed for 12 hours in order to manufacture a titania nano sol. The sol thus manufactured is vacuum-dried with a 0.02-μm membrane and dried at a room temperature for 12 hours to obtain its powder form. As a result of x-ray diffractometer analysis of the powder, it is shown that the crystallite size is about 10.64 nm, and that greater than 99% of the powder is in the form of rutile crystals.

Preferred Embodiment 8

A mixed solution of deionized water and hydrogen peroxide (35 wt. %) is made by mixing them at a mole ratio of 10:1 in a 250-ml Erlenmeyer flask. 0.018 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 60° C., and the solution is refluxed for 12 hours in order to manufacture a titania nano sol. The sol thus manufactured is vacuum-dried with a 0.02-μm membrane and dried at a room temperature for 12 hours to obtain its powder form. As a result of x-ray diffraction analysis of the powder, it is shown that the crystallite size is about 1.32 nm, and that greater than 99% of the powder is in the form of anatase crystals having very low crystal peak intensity.

Preferred Embodiment 9

A mixed solution of deionized water and hydrogen peroxide (35 wt. %) is made by mixing them at a mole ratio of 10:1 in a 250-ml Erlenmeyer flask. 0.018 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 120° C., and the solution is refluxed for 1 hour in order to manufacture a titania nano sol. The sol thus manufactured is vacuum-dried with a 0.02-μm membrane and dried at a room temperature for 12 hours to obtain its powder form.

As a result of x-ray diffraction analysis of the powder, it is shown that the crystallite size is about 1.09 nm, and that greater than 99% of the powder is in the form of anatase crystals having very low crystal peak intensity.

Preferred Embodiment 10

A mixed solution of deionized water and hydrogen peroxide (35 wt. %) is made by mixing them at a mole ratio of 10:1 in a 250-ml Erlenmeyer flask. 0.018 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 120° C., and the solution is refluxed for 2 hours in order to manufacture a titania nano sol. The sol thus manufactured is vacuum-dried with a 0.02-μm membrane and dried at a room temperature for 12 hours to obtain its powder form. As a result of x-ray diffraction analysis of the powder, it is shown that the crystallite size is about 2.41 μm, and that about 80% of the powder is rutile crystals and about 20% is anatase crystals.

Preferred Embodiment 11

A mixed solution of deionized water and hydrogen peroxide (35 wt. %) is made by mixing them at a mole ratio of 10:1 in a 250-ml Erlenmeyer flask. 0.018 mole ratio of TTIP with respect to that of hydrogen peroxide is added to the mixed solution and stirred for 30 minutes. An aqueous solution of red-orange transparent peroxotitanate is manufactured. The flask is placed on an oil bath of which temperature is adjusted in advance to 120° C., and the solution is refluxed for 3 hours in order to manufacture a titania nano sol. The sol thus manufactured is vacuum-dried with a 0.02-μm membrane and dried at a room temperature for 12 hours to obtain its powder form. As a result of x-ray diffraction analysis of the powder, it is shown that the crystallite size is about 12.01 nm, and that about 99% of the powder is in the form of rutile crystals.

COMPARATIVE EXAMPLE 1

Into a 250-ml Erlenmeyer flask, 250 g of deionized water and 500 g of acetone are put and mixed, and 35 g of TTIP is added to the mixture slowly and stirred for 30 minutes to produce titanium hydroxide precipitates. Titanium hydroxide powder is manufactured by filtering the above precipitates with filter paper and drying at a room temperature for 24 hours. The dried powder is treated with heat at 100-900° C. for 2 hours and is subjected to x-ray diffraction analysis. The results of analysis show that no crystals are formed at a temperature below 300° C., the powder is converted to anatase crystals at a temperature higher than 400° C., and rutile crystals appear at a temperature higher than 900° C.

COMPARATIVE EXAMPLE 2

An aqueous solution of $TiOCl_2$ is made by slowly adding 25 g of $TiCl_4$ to 250 g of ion exchange water in a 250-ml Erlenmeyer flask. A titanium hydroxide cake is manufactured by filtering with filter paper and washing titanium hydroxide precipitates made by adding ammonia water to the above solution. A viscous orange solution is made by adding 500 g of 35% $H_2O_2$ to the above cake, after which a titania nano sol is manufactured by treating the orange solution with heat in an oil bath adjusted to 120° C. for 20 hours. The results of x-ray diffraction analysis of the above sol particles after they are collected and dried show that greater than about 99% of the sol particles is anatase crystals.

INDUSTRIAL APPLICABILITY

As illustrated in the above, the rutile titania ($TiO_2$) nano sols manufactured according to the present invention have a particle size of about 30 nm, of which greater than about 99% is rutile crystals, has no ionic impurities contained at all, and has high-purity titania nano particles dispersed stably in an aqueous solution.

Accordingly, the rutile sols manufactured according to the present invention are applicable to electronic and optical materials such as optical materials having a high refractive index, high dielectric transparent insulator film materials for organic thin film transistors (OTFTs), etc., since its crystal phase has a rutile structure completely, which means that it has high refractive index and dielectric constant, a particle size of less than about 30 nm, a very excellent dispersibility of the medium in the form of a sol, no ionic impurities at all, and can form coating films that are strong against polymers, metals, inorganic substrates through drying at a room temperature even without separate additives.

While certain present preferred embodiments and comparative examples of the invention have been shown and described, it is to be distinctly understood that the invention is not limited thereto but may be otherwise variously embodied and practiced within the scope of the following claims.

What is claimed is:

1. A process for manufacturing water-dispersible rutile nano sol particles consisting of titania, comprising the steps of:
    i) manufacture of a mixed solvent consisting of water and hydrogen peroxide; wherein a mole ratio of water to hydrogen peroxide is 10-20;
    ii) having hydrolysis and the formation of peroxotitanate occur simultaneously by dropping down titanium tetraisopropoxide to said mixed solvent of water and hydrogen peroxide, wherein a mole ratio of titanium tetraisopropoxide to hydrogen peroxide is 0.01-0.03; and
    iii) hydrothermal treatment at 90-120° C. for 3-24 hours of an aqueous solution in which said peroxotitanate is dissolved,
    wherein the steps i), ii) and iii) are performed in that order.

2. The process for manufacturing water-dispersible rutile nano sol particles consisting of titania of claim 1, characterized by that the purity of said water-dispersible rutile nano sol particles consisting of titania is greater than 99.99%, wherein said purity is based on the intensity ratio of peak of the rutile nano sol particles consisting of titania in X-ray difffractometry.

* * * * *